United States Patent [19]

Arakawa et al.

[11] Patent Number: 5,396,430
[45] Date of Patent: Mar. 7, 1995

[54] ON-BOARD NAVIGATION APPARATUS

[75] Inventors: Takeharu Arakawa; Morio Araki; Kiyoshi Yamanaka, all of Kawagoe, Japan

[73] Assignee: Pioneer Electronic Corporation, Tokyo, Japan

[21] Appl. No.: 848,924

[22] Filed: Mar. 10, 1992

[30] Foreign Application Priority Data

Apr. 25, 1991 [JP] Japan .................. 3-095262

[51] Int. Cl.6 ............................ G06F 15/50
[52] U.S. Cl. .................. 364/449; 364/443; 340/990; 340/995
[58] Field of Search ............ 364/443, 444, 449; 73/178 R; 340/988, 990, 995

[56] References Cited

U.S. PATENT DOCUMENTS

| | | | |
|---|---|---|---|
| 4,550,317 | 10/1985 | Moriyama et al. | 364/449 |
| 4,571,684 | 2/1986 | Takanabe et al. | 340/995 |
| 4,660,037 | 4/1987 | Nakamura | 340/990 |
| 4,891,760 | 1/1990 | Kashiwazaki et al. | 364/449 |
| 4,937,572 | 6/1990 | Yamada et al. | 340/995 |
| 5,117,363 | 5/1992 | Akiyama et al. | 340/995 |

FOREIGN PATENT DOCUMENTS 0082036 6/1983 European Pat. Off. .
63-12096 1/1988 Japan .

OTHER PUBLICATIONS

Patent Abstracts of Japan vol. 15, No. 122 (P-1184) Mar. 26, 1991 (JPA 30 10 278).
Patent Abstracts of Japan vol. 11, No. 42 (P-545) Feb. 6, 1987 (JPA 61 212 723).
Patent Abstracts of Japan vol. 15, No. 122 (P-1184) Mar. 26, 1991 (JPA 30 10 281).
Patent Abstracts of Japan vol. 14, No. 585 (P-1184) Dec. 27, 1990 (JPA 22 51 985).

*Primary Examiner*—Gary Chin
*Attorney, Agent, or Firm*—Sughrue, Mion, Zinn, Macpeak & Seas

[57] ABSTRACT

An on-board navigation apparatus is designed to shorten the time for a display operation at the time of displaying a map and scrolling a screen while employing a buffer memory with a smaller memory capacity. The apparatus reads only block data of a block containing a display center point and block data of blocks adjoining thereto and stores the data into a buffer memory, and acquires display data forming a display screen with the display center point as a reference point from the buffer memory and performs a display operation. The reading/storing operation includes an operation of storing the block containing the display center point and blocks adjoining thereto separately into the buffer memory. The display control operation includes an operation of temporarily storing the display data into a display buffer memory before displaying it.

5 Claims, 13 Drawing Sheets

ON-BOARD NAVIGATION APPARATUS

BACKGROUND OF THE INVENTION

1. Field of the Invention

The present invention relates to an on-board navigation apparatus, and, more particularly, to an on-board navigation apparatus which displays a screen including map information on a display unit (hereinafter referred to as "display") on the basis of the location of the vehicle in which the apparatus is mounted.

2. Description of Background Information

Recently on-board navigation apparatuses have come to be employed practically, which are designed to have map information stored in memory, read the map information from the memory, and display it on a display together with the current location of a vehicle in order to guide the vehicle to an intended destination.

On-board navigation apparatuses should accurately and promptly provide a driver with the proper and latest map information that covers the current location or meets the user's request, in accordance with the location of the constantly moving vehicle, i.e., the current location of the vehicle, sequentially by means of a display. The on-board navigation apparatuses therefore require faster reading of map information from the memory and quicker presentation of the map information on the display. FIG. 1 presents a block diagram which illustrates the general structure of such an on-board navigation apparatus and exemplifies a display device designed to display the needed information on the display.

Referring to this diagram, a terrestrial magnetism sensor 1 outputs the direction data of the vehicle based on terrestrial magnetism (geomagnetic field), an angular velocity sensor 2 detects the angular velocity of the vehicle, a travel distance sensor 3 detects the distance of the vehicle, and a GPS (Global Positioning System) device 4 detects the current location of the vehicle or the like from latitude and longitude information and the like. Outputs from these sensors and device are supplied to a system controller 5.

The system controller 5 comprises an interface 6, a CPU (Central Processing Unit) 7, a ROM (Read Only Memory) 8, a RAM (Random Access Memory) 9, a recording medium 10, a buffer memory 11, a graphic controller 13, and a display controller 15. The interface 6 receives outputs of the sensors 1 to 3 and GPS device 4, and performs processing, such as A/D conversion, on the received data. The CPU 7 computes the amount of travel, etc. of the vehicle, on the basis of the data from the sensors 1 to 3 and GPS device 4 which are sequentially sent from the interface 6 as well as processes a variety of image data. In the ROM 8 various processing programs for the CPU 7 and other necessary information are previously stored. The RAM 9 is accessed so that information necessary for executing the programs will be written therein or read out therefrom. The recording medium 10, constituted of a so-called CD-ROM, IC card, or the like, has digitized map information previously recorded thereon. The buffer memory 11, constituted by a V-RAM (Video RAM) or the like, serves as a frame buffer to temporarily store image information that is promptly displayable. The graphic controller 13 draws received graphic data, such as maps, into the buffer memory 11 and outputs the data as image information in response to a command from the CPU 7. The display controller 15 controls a display 12 such as a liquid crystal display device or CRT in accordance with the image information from the graphic controller 13. An input device 14, constituted by a keyboard or the like, issues various commands and the like to the system controller 5 when a user operates keys.

A description will now be given of the operation of the display control section of this on-board navigation apparatus in FIG. 1, which comprises the buffer memory 11, graphic controller 13 and display controller 15.

The CD-ROM 10 contains 16 sheets of map data as block data, which are image data corresponding to 16 blocks acquired by dividing, for example, the map of Japan into four sections in each of the vertical direction (north and south) and horizontal direction (east and west). FIG. 2 illustrates a memory structure image in the CD-ROM 10. One piece of block data or one sheet of map data contains image information corresponding to the map of the associated area with a capacity of 320 dots horizontal by 240 dots vertical, with map codes 00$m$ to 33$m$ affixed to each piece of map data as illustrated.

The storage contents of the buffer memory 11 are expressed by the memory structure image as given in FIG. 3. The buffer memory 11 has a memory area of 640 dots horizontal by 480 dots vertical per memory unit, where four sheets of the above map data are storable. This memory area will hereafter be referred to as "drawing screen". The buffer memory 11 has a capacity to store four drawing screens 0H to 3H which are to be arranged as illustrated.

The display 12 can extract drawing data to be displayed in an arbitrary area d of 320 dots horizontal by 240 dots vertical in an arbitrary drawing screen from the screen data of four screens, written in the buffer memory 11 by the graphic controller 13, and enable the extracted data to be displayed. As this area d is displayed on the display 12, the area will hereafter be referred to as "display screen".

A description will now be given of what procedures the CPU 7 executes to display given drawing data on the display 12 with the above memory structures and hardware conditions, or a method of displaying and scrolling screens.

FIG. 4 is a flowchart illustrating the procedures. This flowchart is extracted from the main routine, which performs the general control of the navigation system. The main routine is a program disclosed in, for example, Japanese Unexamined Parent Publication No. 63-12096, and its detailed description will not be given here.

When the display screen d and a display center (e.g., vehicle's location) P as a reference point to determine the position of that display screen on a map before scrolling are positioned in the map of Japan as in FIG. 5, for example, and screen scrolling is instructed by a user operating the keyboard or the system's request, the CPU 7 first reads out the latitude and longitude of the new display center point P from the RAM 9 (step S1).

On the basis of the latitude and longitude of that display center point P, the CPU 7 fetches a map code 12$m$ of the map including the point P, and computes map codes for eight maps surrounding that map, 01$m$, 02$m$, 03$m$, 11$m$, 13$m$, 21$m$, 22$m$ and 23$m$ (step S2).

The map codes are codes to identify individual pieces of block data, so that the mutual positional relationship between the block data may be found out. The CPU 7 therefore determines from the acquired map codes whether or not predetermined four types of screens (four screens, each composed of four pieces of map and each including the piece which contains the display center point P as the lower right portion, lower left portion, upper right portion and upper left portion thereof) have already been drawn in the drawing screens 0H to 3H in the buffer memory 11 (step S3). As the display center point P lies in the map with the map code 12m, the drawing screen 0H will consist of the map with that map code 12m located on the lower right, and three other maps adjacent thereto, and the drawing screens 1H to 3H will respectively include the map with the map code 12m on the lower left, upper right and upper left, as shown in FIG. 6, so that the CPU 7 can determine the screen arrangements.

If the conditions in the above step S3 for the drawing screens 0H to 3H are not satisfactory, the CPU 7 reads out the necessary map data to be supplied from the CD-ROM 10, and recombines map data in the drawing screen in the buffer memory 11 with the supplemented data or writes it in the drawing screen (step S4). If those conditions are met, which means that no alteration of the drawing screens is necessary, the CPU 7 will not access the CD-ROM 10, leaving the individual drawing screens intact to maintain the contents in the previous flow.

With the necessary map data arranged on the individual drawing screens, the CPU 7 acquires a drawing screen that includes the entire display screen d (step S5). This drawing screen is the drawing screen 2H in this example as shown in FIG. 6.

Then, among the acquired drawing screen 2H that region of the display screen d to be displayed on the display 12 with the display center point P located as shown in FIG. 5 will be computed (step S6). The region of the display screen d can be obtained by segmenting the drawing data (map data) according to address information which only the drawing screen 2H has independently of the other drawing screens and checking the segments with coordinates on the display screen d.

The graphic controller 13 transfers the drawing data, read from the buffer memory 11, as display data to the display controller 15 together with various sync signals on the basis of the attained address information, and the display controller 15 converts the received display data into a proper signal and drives the display 12 to display the display data before the flow returns to the main routine (step S7).

With the above-described arrangement, as long as the display center point P lies in the same block (the map with the map code 12m in this case), the drawing screen to be displayed and a region in that drawing screen have only to be changed, requiring no writing of new map data in the drawing screen. That is, since no data is transferred from the CD-ROM 10 to the buffer memory 11, the operational sequence up to data display can be executed at a high speed.

When the display center point P moves beyond the region of the map with the map code 12m into the block with the map code 11m as shown in FIG. 7, for example, those map data with the map codes 03m, 13m and 23m in the drawing screens before scrolling, i.e., the drawing screens 1H and 3H in FIG. 6, become unnecessary. When map data to be drawn in a drawing screen is insufficient, therefore, the storage contents of the drawing screens 1H and 3H having the map data with the map code 11m located on the lower right and upper right as shown in FIG. 8 will be rewritten anew as explained in the descriptions of steps S3 and S4. Therefore, eight sheets of maps in total are to be transferred from the CD-ROM 10 to the buffer memory 11.

In the flow of the display operation including scrolling, what takes most time is a process of reading data from the CD-ROM 10 and writing map data in a drawing screen in the buffer memory 11 as done in step S4. This means that the less the amount of map data to be written in the memory, the shorter the processing time becomes accordingly. On the premise that the above-described memory structures are provided for the drawing screen and display screen, however, the memory capacity must be increased, thus making it difficult to easily accomplish a faster display operation.

OBJECT AND SUMMARY OF THE INVENTION

It is therefore an object of the present invention to provide an on-board navigation apparatus which can shorten the time for a display operation in the case where a screen is scrolled while reading out map data from a recording medium and displaying it, and needs a smaller memory capacity to store image data.

An on-board navigation apparatus according to the present invention comprises a reading/storing means for reading only block data of a block containing a display center point and block data of blocks adjoining thereto from a storage medium where image data forming one consecutive screen is stored for each piece of block data corresponding to a block on the screen, and storing the read-out pieces of block data separately into a buffer memory; and a display control means for acquiring display data forming a display screen with the display center point as a center from the buffer memory and performing a display operation on the basis of the display data, the display control means having a display buffer memory for temporarily storing the display data so that the display operation may be carried out on the basis of the display data.

The on-board navigation apparatus embodying the present invention reads a data block containing a display center point and its adjoining data blocks from the storage medium and stores the data blocks in a drawing screen area in the buffer memory, copies necessary drawing data to be displayed from a drawing screen into a display screen prepared in a frame buffer memory for temporary storage, and then performs control to display the drawing data stored in the display screen as display data.

DETAILED DESCRIPTION OF THE PREFERRED EMBODIMENT

Figure 1:
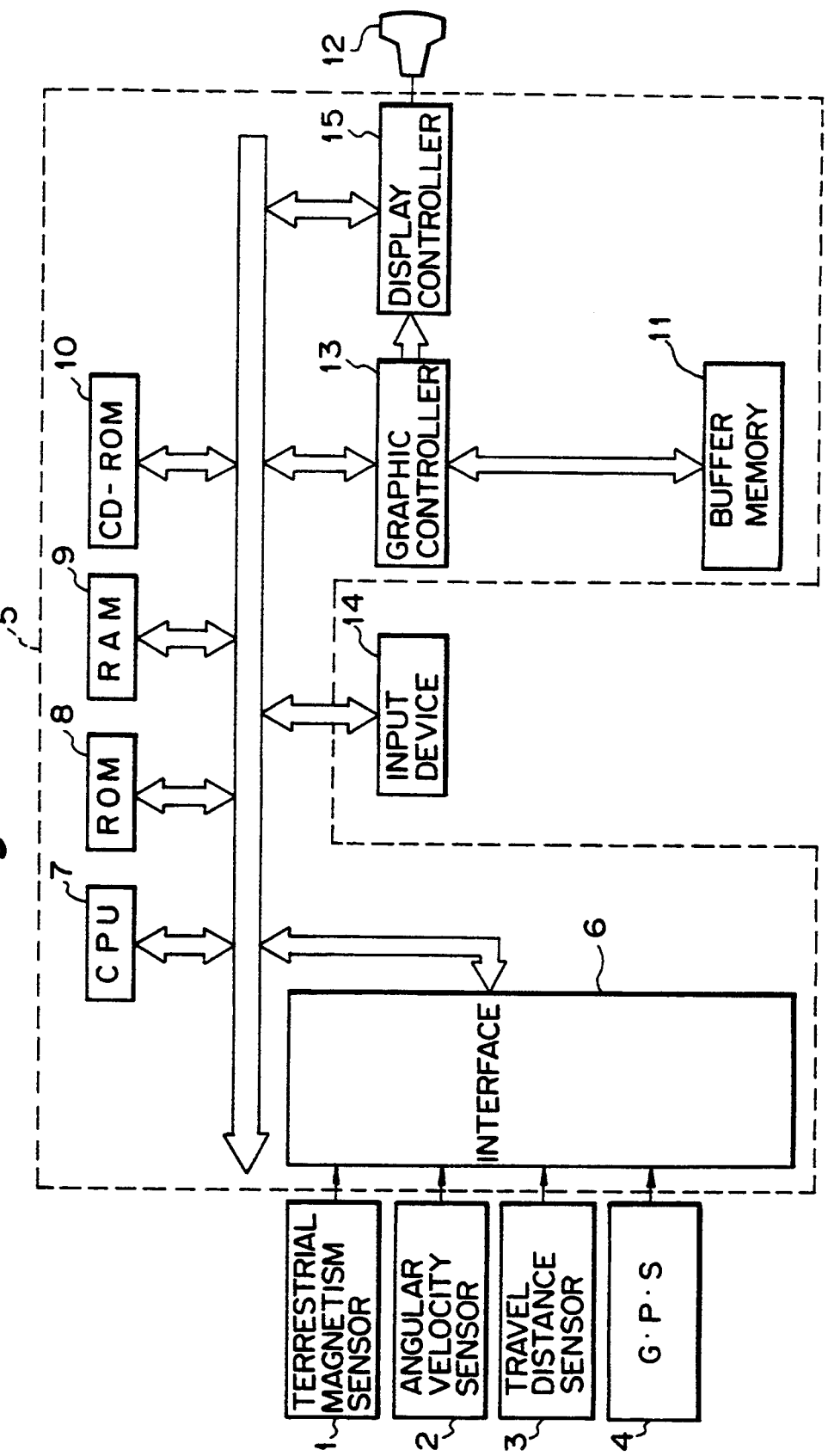
FIG. 1 is a block diagram exemplifying the structure of an on-board navigation apparatus.
Figure 2:
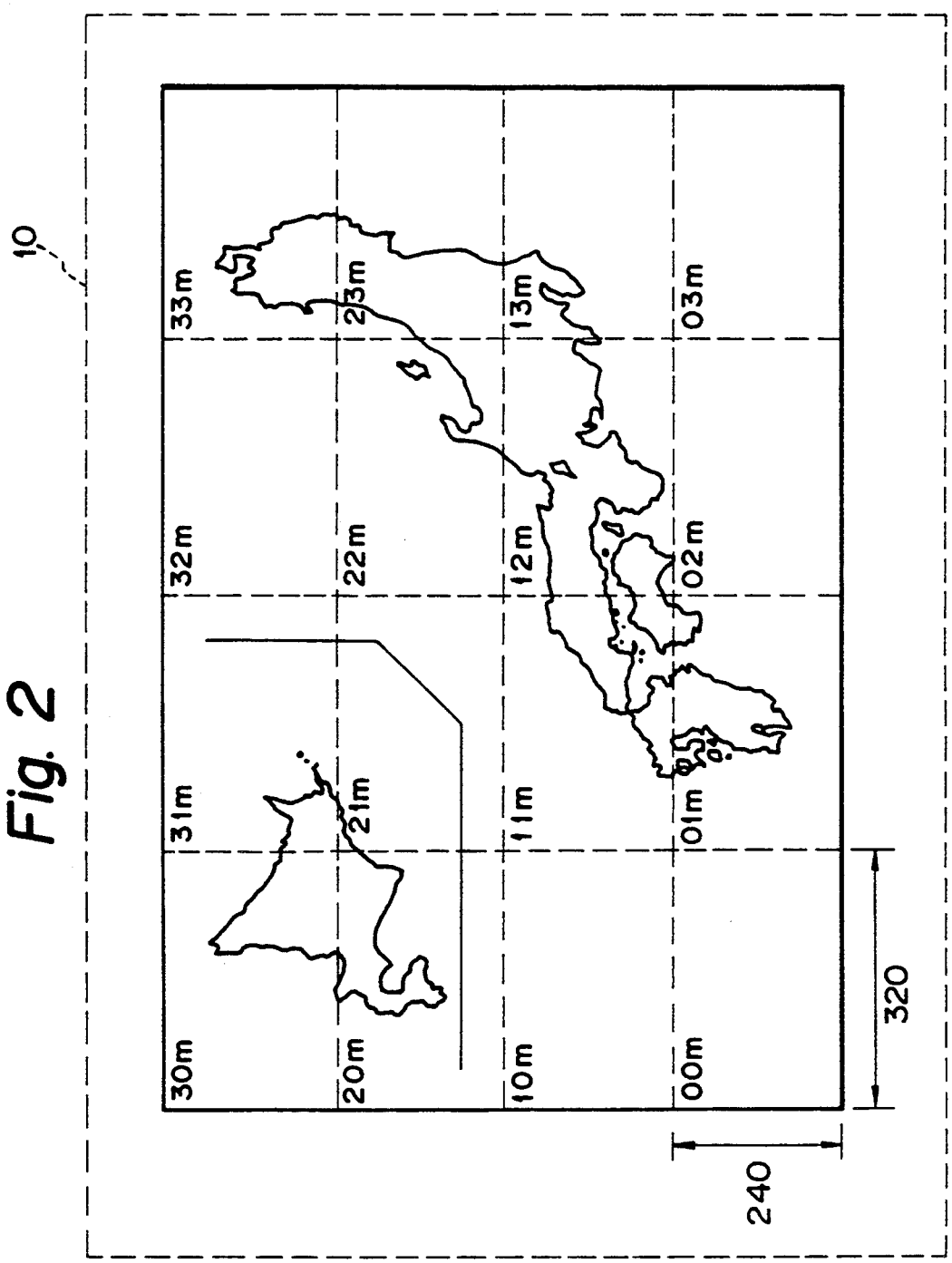
FIG. 2 is a diagram exemplifying the arrangement of map data in a CD-ROM.
Figure 3:
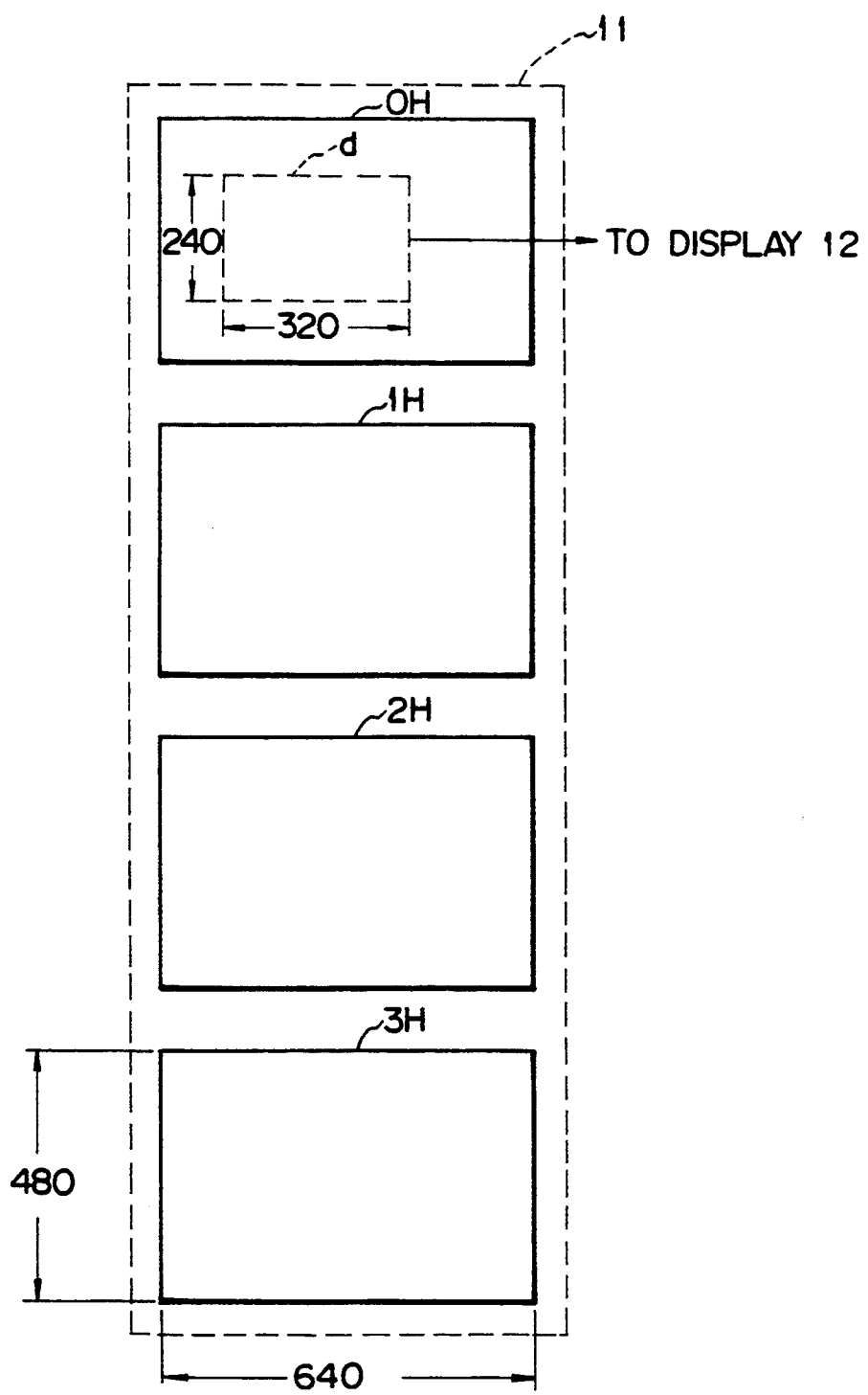
FIG. 3 is a flowchart exemplifying how drawing screens are arranged in a buffer memory according to prior art.
Figure 4:
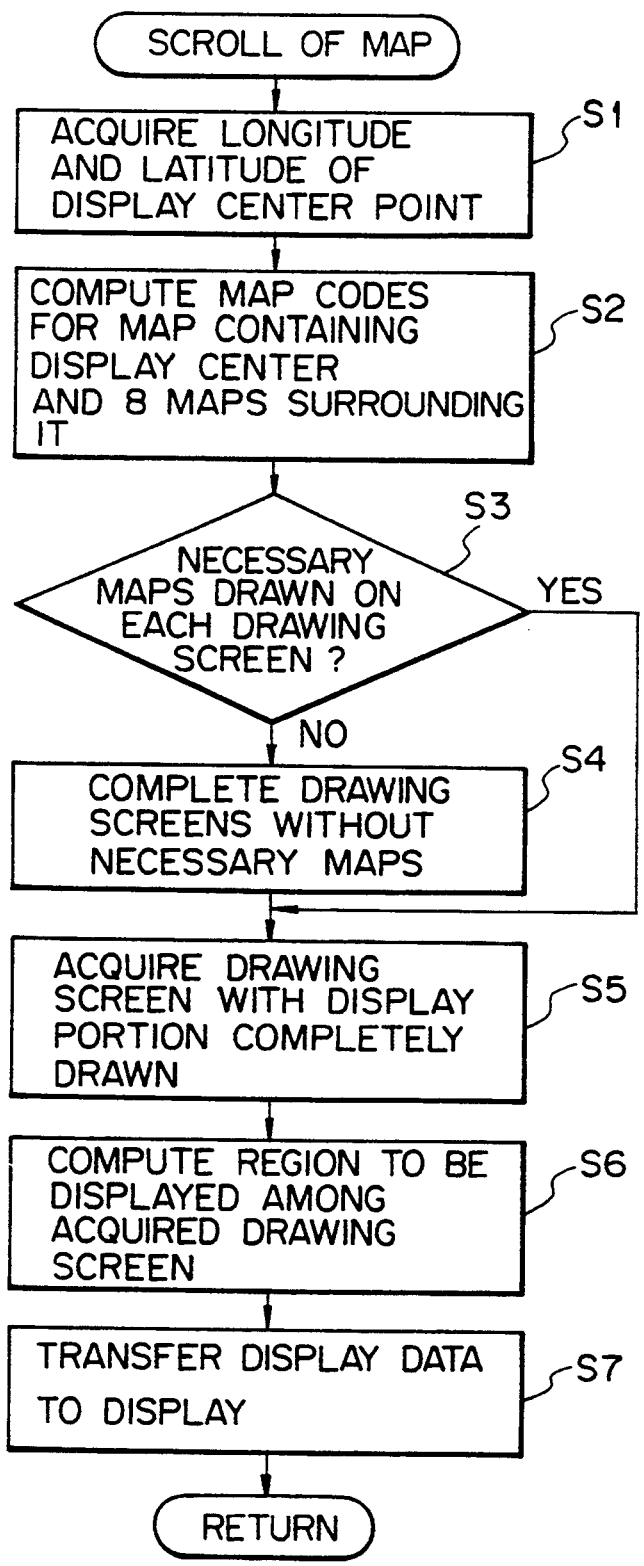
FIG. 4 is a flowchart illustrating procedures for displaying maps on a screen and scrolling the screen according to the prior art.

A preferred embodiment of the present invention will now be described referring to the accompanying drawings, The following description will be given on the premise that hardware structure is the same as illustrated in FIG. 1 and map data to be stored in the CD-ROM 10 is the same as shown in FIG. 2.

Figure 9:
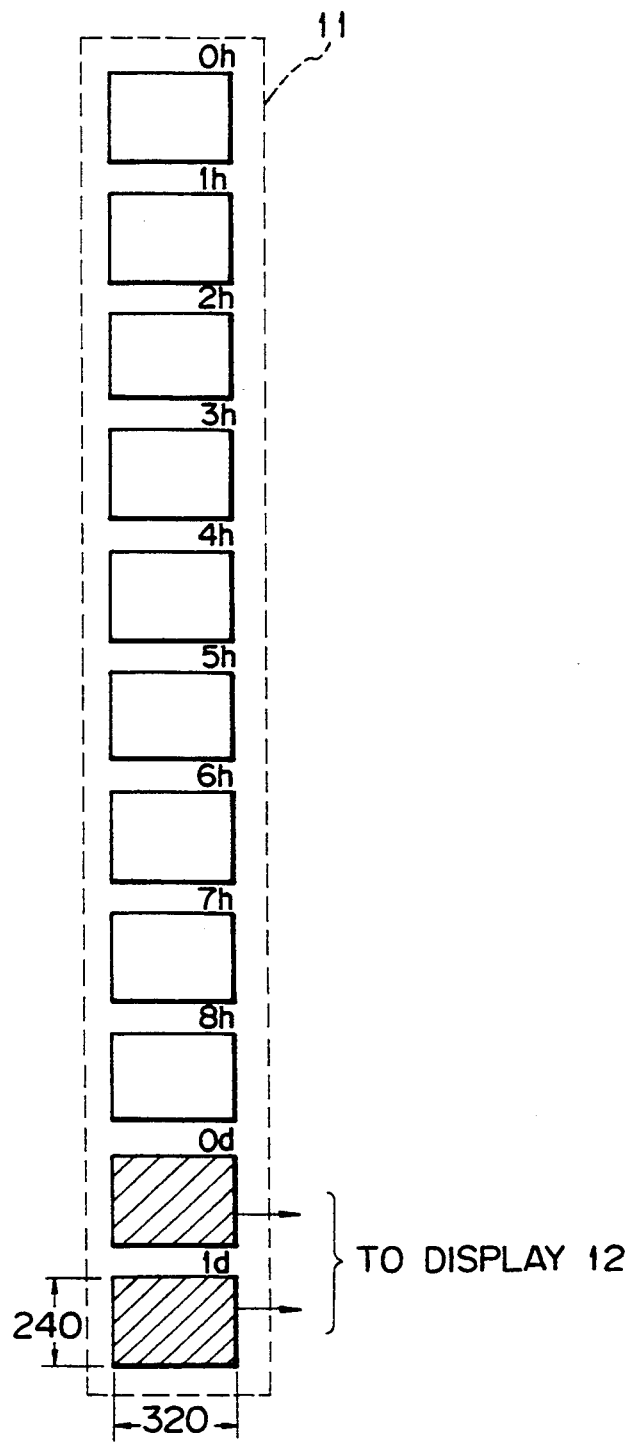
FIG. 9 is a flowchart exemplifying how drawing screens and a display screen are arranged in a buffer memory according to an embodiment of the present invention.

In this embodiment, as shown in FIG. 9 the buffer memory 11 has a memory capacity to store 11 drawing screens each of 240 dots vertical by 320 dots horizontal, the same as the memory area for one piece of block data or map data. In the buffer memory 11, display screens 0d and 1d (which will occasionally be referred to as "display screen d" as their general term), are secured as so-called frame buffers to hold regions to be displayed. Also secured in the buffer memory 11 are drawing screens 0h to 8h for separately storing map data around the display screens. The display screens 0d and 1d perform a front and back display control, and will be described in detail later.

Figure 10:
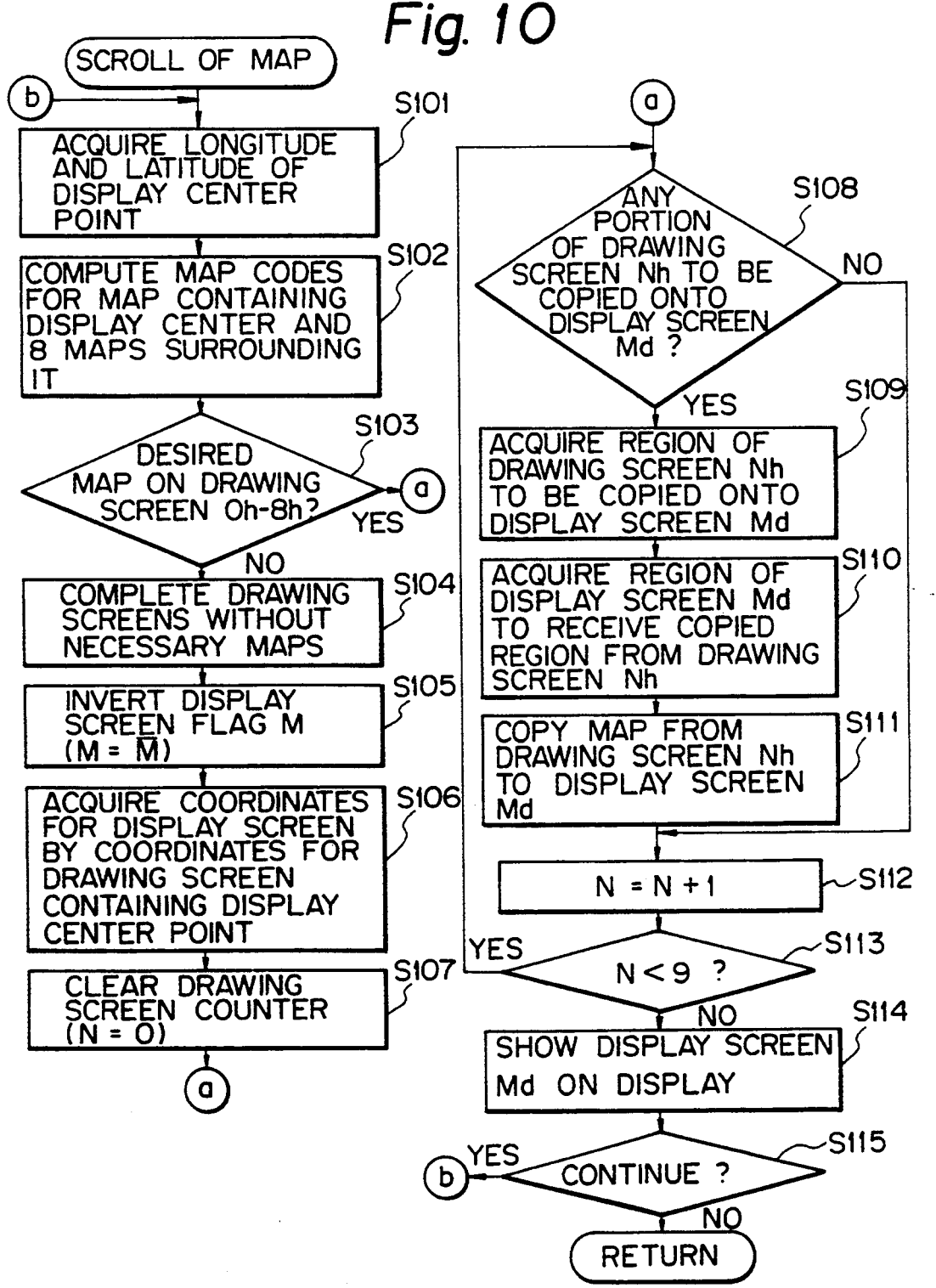
FIG. 10 is a flowchart illustrating procedures for displaying maps on a screen and scrolling the screen according to this embodiment.

FIG. 10 presents a flowchart illustrating procedures for display control in the on-board navigation apparatus of the present invention which has the above-described memory structure. The procedures are extracted from the main routine which performs the general control of the navigation system, and the description of the main routine will not be given as in the description of the prior art.

Figure 5:
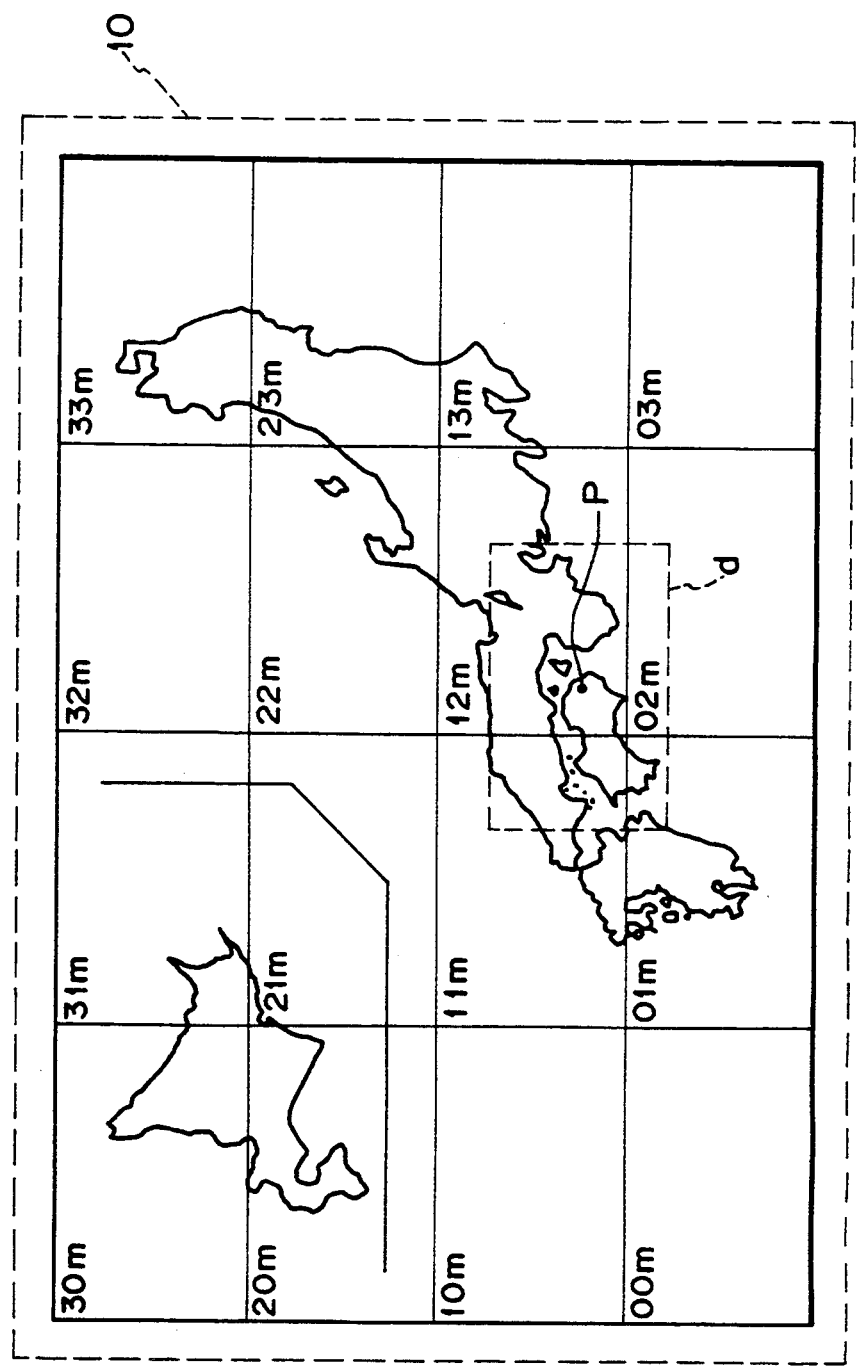
FIG. 5 is a diagram showing an example of the position of a display center point on an entire map.
Figure 6:
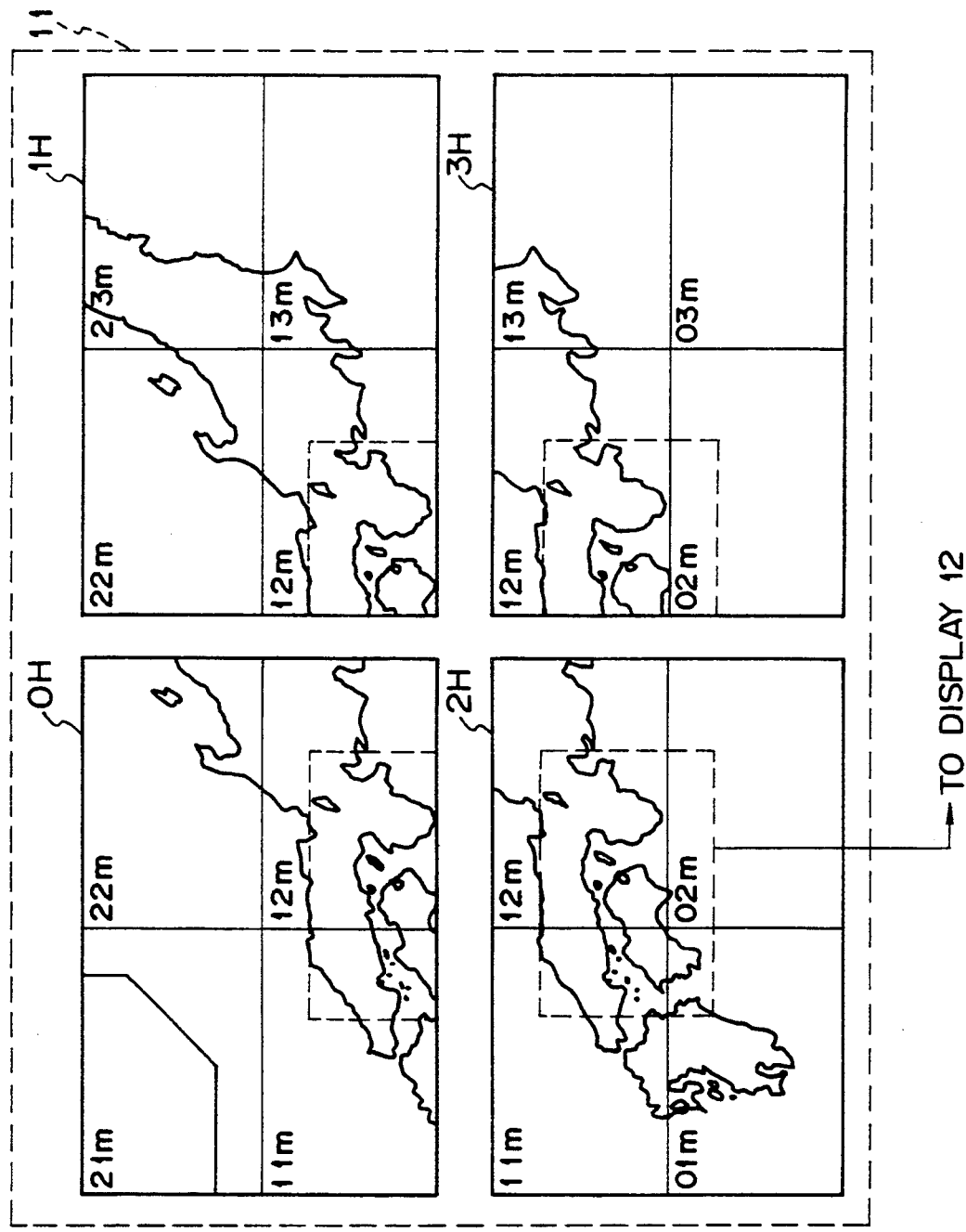
FIG. 6 is a diagram showing how map data in FIG. 5 is stored in the buffer memory according to the prior art.

When the display screen d and the display center P before scrolling are positioned on the aforementioned map of Japan as shown in FIG. 5, for example, and screen scrolling is instructed by a user operating the keyboard or the system's request, the CPU 7 first reads out the latitude and longitude of the new display center point P from the RAM 9 (step S101).

On the basis of the latitude and longitude of that display center point P, the CPU 7 fetches a map (map code 12m) including the point P, and computes map codes for eight maps surrounding that map, 01m, 02m, 03m, 11m, 13m, 21m, 22m and 23m (step S102).

Figure 11:
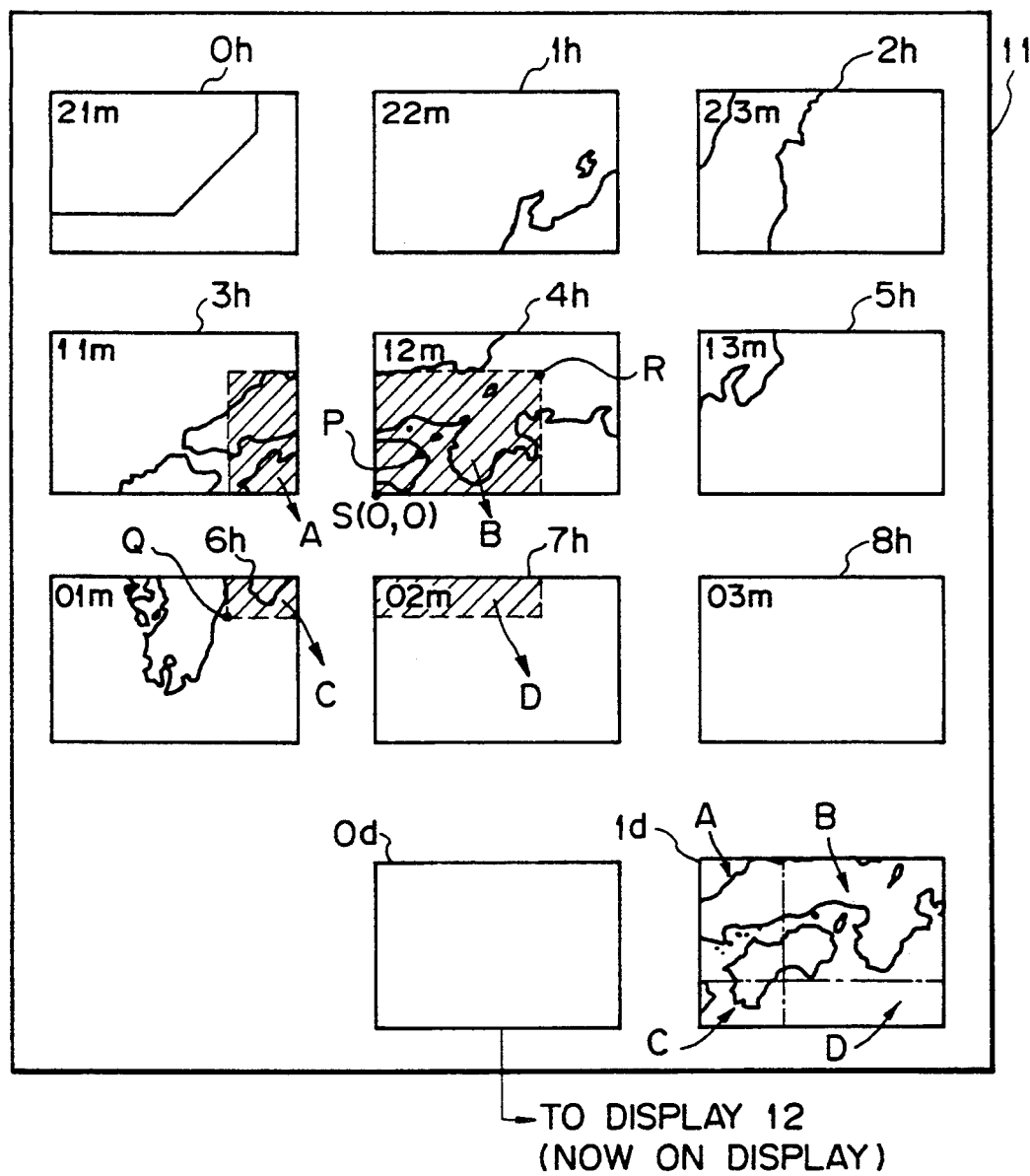
FIG. 11 is a diagram showing how map data in FIG. 5 is stored in the buffer memory according to this embodiment.

The CPU 7 then determines whether or not all pieces of map data with the acquired nine map codes have already been stored in the drawing screens 0h to 8h in the buffer memory 11 (step S103). FIG. 11 illustrates how such desired pieces of map data are stored in the buffer memory 11.

If any one of the nine drawing screens lacks necessary map data, the supplemental map data is newly read out from the CD-ROM 10 and is written in the drawing screen (step S104). If the conditions in step S103 are satisfactory and all the needed pieces of map data are in the drawing screens 0h to 8h, the CPU 7 will not access the CD-ROM 10, leaving the storage contents of each drawing screen unchanged, and will move to the next step S108.

After the required pieces map data are arranged on all the drawing screens as shown in FIG. 11 in step S104, a display screen flag M will be inverted (step S105). The display screen flag M is a marker bit, which is used in the aforementioned front and back display control to identify a screen to be displayed on the display 12. That is, the display 12 is controlled on the basis of display data stored in either the display screen 0d or 1d; for example, when the display screen flag M=0, the display screen 0d is designated as the front screen, and with M=1, the display screen 1d is designed as the back screen.

Then the coordinates which determine the display screen d are computed from the coordinates of the drawing screen 4h that contains the display center point P (step S106). For instance, provided that the coordinates of the display center point P in the drawing screen 4h are (X0, Y0), the coordinates of a lower left corner point Q in the display screen 1d (shaded portion) are (X1, Y1), and the coordinates of a upper right corner point R are (X2, Y2), the coordinates defining the display screen d are calculated from the following equations.

$$X1 = X0 - 160 \qquad Y1 = Y0 - 120$$
$$X2 = X0 + 159 \qquad Y2 = Y0 + 119$$

In other words, the point Q is where the display center point P is moved downward by a half the vertical size of the display screen and leftward by a half the horizontal size of the display screen, and likewise the point R is where the point P is moved upward by a half the vertical size and rightward by a half the horizontal size. These points Q and R define the display screen. It is to be noted that the coordinates of the display center point P, (X0, Y0), are computed from the longitude and latitude information of the map data previously stored in the CD-ROM 10, and more specifically, from the longitude and latitude information of the lower left corner point S of the drawing screen 4h and those of the display center point P, taking the point S as the origin's coordinates (0, 0).

After step S106, a drawing screen counter is cleared so that its count value N may be set equal to 0 (step S107). The count value N specifies the drawing screens 0h to 8h.

After the step S107, the CPU 7 determines whether or not the drawing data in the drawing screen Nh specified by the drawing screen counter is what should be copied into the display screen Md designated in the above-described manner (step S108). When N=6, which means that the drawing screen counter has specified the drawing screen 6h, the CPU 7 executes a process as illustrated in FIG. 12, for example, to determine if any drawing screen has a portion overlapping the display screen 1d.

Figure 12:
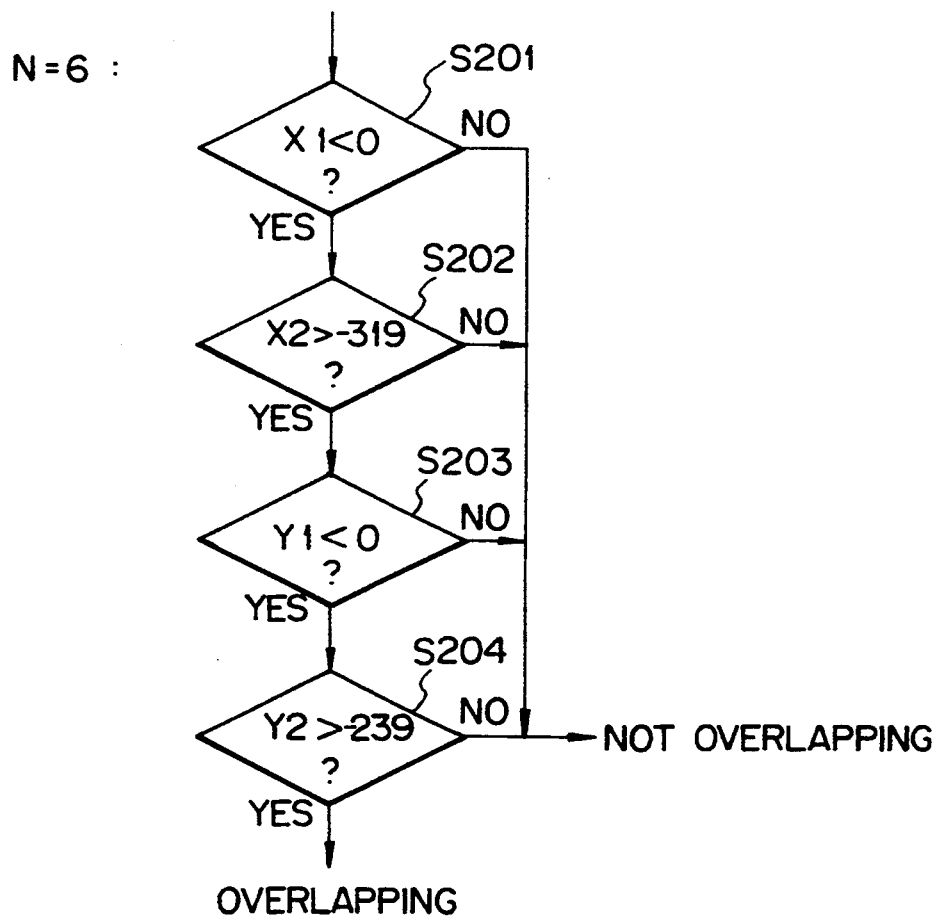
FIG. 12 is a flowchart exemplifying a process of discriminating if the display screen overlaps any drawing screen according to this embodiment.

Referring to FIG. 12, steps S201 and S202 are for determining if the conditions for the X axis for the display screen 1d or 0d to overlap the drawing screen 6h are satisfied, and steps S203 and S204 are for determining if the overlapping conditions for the Y axis are satisfied. The same discrimination can be conducted for the other drawing screens by changing the individual values to be compared and discriminated. In this manner, therefore, it is possible to check which drawing screen overlaps the display screen on the basis of the coordinates of the lower left corner point and upper right corner point of the display screen.

If it is judged that the drawing screen Nh contains a portion which should be copied into the display screen Md, such as the drawing screens 3h, 4h, 6h and 7h in FIG. 11, a region to be copied into the display screen Md is acquired (steps S109 and S110). To accomplish the copying, the coordinates (Xh, Yh) of the portion of the drawing screen to be copied and the coordinates (Xd, Yd) of the portion of the display screen where the copying is made must be specified to the graphic controller 13. For the drawing screen 6h overlapping the display screen, for example, those coordinates are computed from the following equations.

$$Xh = 319 + X1 \quad Yh = 239 + Y1$$
$$Xd = -X1 \quad Yd = -Y1$$

For the other drawing screens that overlap the display screen, the computation is likewise carried out using different sets of equations.

After computing the necessary coordinates for the copying process, the CPU 7 copies the drawing data in question from the drawing screens in the buffer memory 11 into the display screen on the basis of the specified coordinates (step S111). With regard to the drawing screen 6h, specifying the above coordinates (Xh, Yh), the CPU 7 reads out the associated drawing data and writes the read data on the display screen at the coordinates (Xd, Yd).

If it is judged in step S108 that the drawing screen Nh contains no portion which overlaps the display screen. Md and should be copied therein, such as the drawing screen 0h, 1h, 2h, 5h, 8h in FIG. 11, the steps S109 to S111 will not be executed and the flow jumps over these steps to the next step.

The count value N is incremented by "1" every time the sequence of steps S108 to S111 is carried out (step S112), and copying into the display screen is repeated as needed until N becomes 9 or the until the flow from step S108 to S112 is complete for all the drawing screens (step S113).

When N=9 and copying is complete, the graphic controller 13 transfers the complete drawing data of the display screen Md to the display controller 15 to display the display screen Md on the display 12 (step S114).

When displaying a single display screen is complete, the flow returns to step S101 to repeat the above-described processes for the next display screen 0d until a request for stopping the Scroll and data display is made (step S115).

Figure 7:
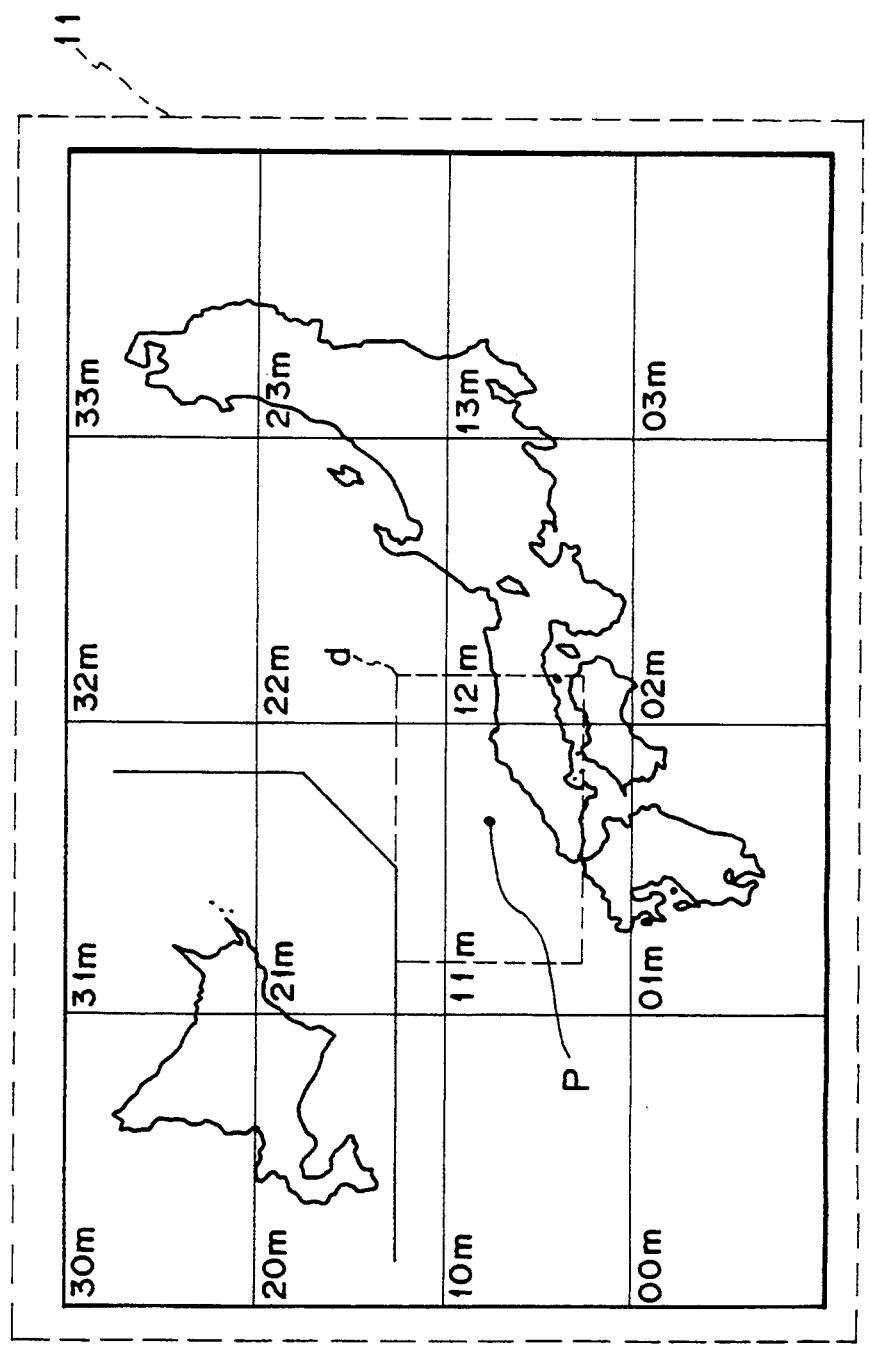
FIG. 7 is a diagram showing an example of the position of a display center point on an entire map.
Figure 8:
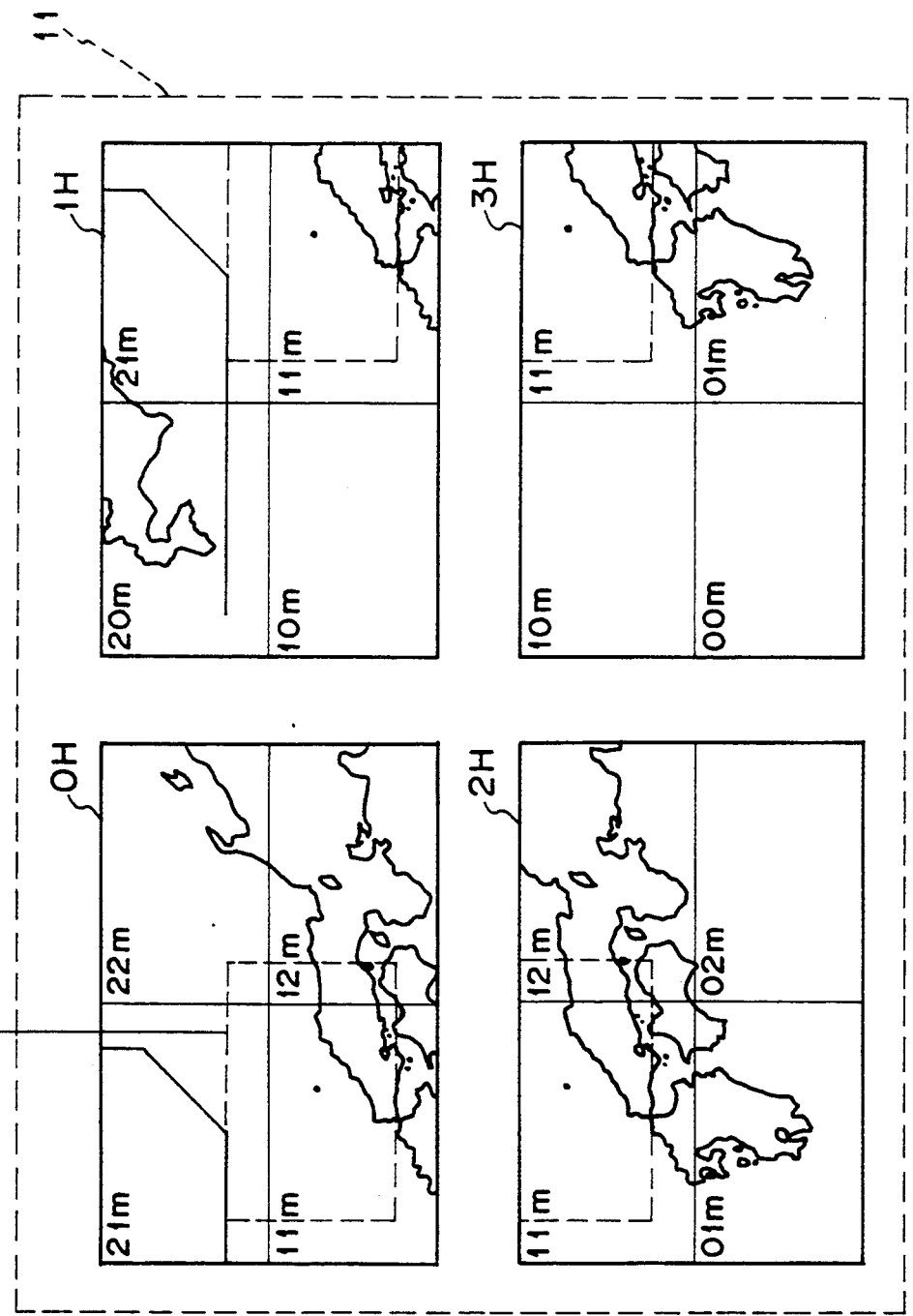
FIG. 8 is a diagram showing how map data in FIG. 7 is stored in the buffer memory according to the prior art.
Figure 13:
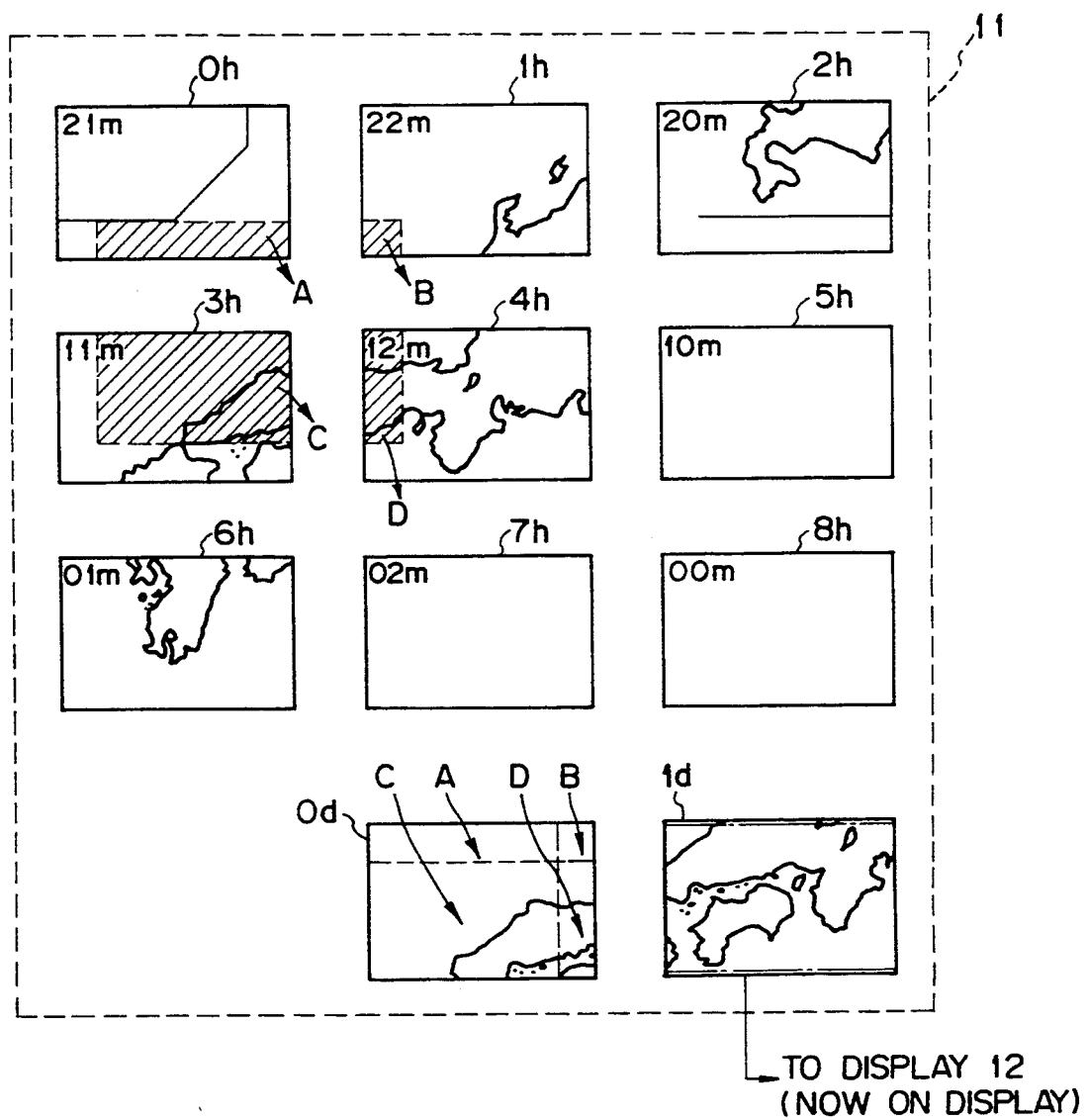
FIG. 13 is a diagram showing how map data in FIG. 7 is stored in the buffer memory according to this embodiment.

According to this embodiment, as long as the display center point P lies in the same block (the map with the map code 12m in this case), the contents of the entire drawing screens need not be changed and those drawing screens and their portions which to be copied into the display screen have only to be altered; new map data need not be drawn. In the case where the display center point P is moved from the map with the map code 12m to the one having the map code 11m as shown in FIG. 7, there are only three drawing screens 2h, 5h and 8h where new map data must be written as shown in FIG. 13, reducing the amount of data to be transferred to the buffer memory 11 from the CD-ROM 10 by five sheets of map data as compared with the prior art method described earlier. This means that the speed for the scroll display operation has been improved.

In step S105 the display screen where copying should be made is specified; this indicates that during displaying one of the display screens, for example, 0d (front screen), the next drawing data to be displayed is copied from the associated drawing screen into the other display screen 1d (back screen), and the front screen 0d is switched to the back screen 1d to display the other display screen 1d after the copying is complete. More specifically, if the display center point is shifted from the position shown in FIG. 5 to the one indicated in FIG. 7, the display screen 1d as shown in FIG. 11 where copying has been made in the previous flow is displayed during execution of the present flow as shown in FIG. 10, and drawing data selected as shown in FIG. 13 is copied into the display screen 0d in the present flow. During displaying the display screen 1d, the display screen 0d in FIG. 13 will not be displayed. This technique can move a displayed character, such as a vehicle indicator or direction marker, more smoothly.

In addition, while the prior art method requires that a memory as a frame buffer have a capacity for four pieces of data of 640 dots by 480 dots or sixteen sheets of map data in terms of map data of 320 dots by 240 dots, the frame buffer in this embodiment needs a capacity for a total of eleven sheets of map data of 320 dots by 240 dots, nine drawing screens and two display screens. The amount of data to be read into all the drawing screens from the CD-ROM 10 upon activation of the system is also reduced, shortening the time required for system initialization.

The prior art method transfers data of a drawing screen to the display controller 15 directly and not via a buffer, so that changing superscription information such as a place name which is to be superimposed on map information or transforming drawing data such as rotating a map may require that all the pieces of map data the drawing screen has must be rewritten. The above-described embodiment however employs a structure to temporarily store map data of drawing screens into a display screen as a buffer before transferring that data to the display controller 15, so that the drawing data in the display screen has only to be rewritten and erasing the superscription information can likewise be done easily.

Although the foregoing description of this embodiment has been given on the premise that there are sixteen sheets of map data, nine drawing screens and two display screens, the embodiment is not limited to this particular case. It is needless to say that the present apparatus is used as a means to display part of a vast amount of data stored in a so-called external storage device and the amount of data to be handled and/or various screens may be properly set in accordance with a machine to which the present apparatus is applied.

As described above, the on-board navigation apparatus of the present invention is designed to prepare display screens as well as drawing screens in a buffer memory, copy necessary drawing data from the drawing screens into the display screen for temporary storage, and then transfer the drawing data held by the display screen to a display control means to perform display control. This design can shorten the time required for a display operation in a screen scrolling operation and needs a smaller memory capacity.

As the total memory capacity needed for a frame buffer is made smaller, the system initialization can be accomplished quicker and the front and back display control for the display screens can be performed easily, thus ensuring smoother screen scrolling. The present invention is therefore particularly advantageous in an on-board navigation apparatus which deals with many display characters.

What is claimed is:

1. An on-board navigation apparatus comprising:
   reading/storing means for reading only block data of a block containing a display center point and block data of blocks adjoining thereto from a storage medium where image data forming one consecutive screen is stored for each piece of block data corresponding to a block on the screen, and storing the read-out pieces of block data separately into a buffer memory; and
   display control means for acquiring display data forming a display screen with the display center point as a center from the buffer memory and performing a display operation on the basis of the display data, said display control means having a display buffer memory for temporarily storing the display data so as to permit said display operation to be carried out on the basis of the display data.

2. An on-board navigation apparatus according to claim 1, wherein said apparatus comprises at least two display buffer memories and wherein the display control means acquires first display data forming a display screen with previous coordinates of the display center point as a center, stores the first display data into one of the at least two display buffer memories, acquires second display data forming a display screen with current coordinates of the display center point as a center, stores the second display data into a second of said at least two display buffer memories, and switches a displaying operation for the first display data to a displaying operation for the second display data when writing the second display data into said second of said at least two display buffer memories is completed.

3. An on-board navigation apparatus as claimed in claim 1, wherein said display control means is operative to calculate coordinates of a display area centered on said display center point, and to copy portions of said display data which has been stored in said buffer memory in blocks, said portions being included in said display area, into said display buffer memory.

4. In an on-board navigation apparatus having a plurality of sensors for determining position and a controller for correlating said position with map coordinates and subsequently displaying said position and a map image containing said coordinates, the improvement comprising:
   reading/storing means for reading only block data of a block containing a display center point and block data of blocks adjoining thereto from a storage medium where image data forming one consecutive screen is stored for each piece of block data corresponding to a block on the screen, and storing the read-out pieces of block data separately into a buffer memory, said buffer memory being divided into a plurality of N discrete storage buffers, where N is an integer; and
   display control means for acquiring display data forming a display screen with the display center point as a center from said storage buffers and performing a display operation on the basis of the display data, said display control means having a display buffer memory for temporarily storing the display data so as to permit said display operation to be carried out on the basis of the display data.

5. The improvement as recited in claim 4, wherein said display buffer memory is divided into at least a first display buffer memory and a second display buffer memory, and wherein the display control means acquires first display data forming a display screen with previous coordinates of the display center point as a center, stores the first display data into said first of said first and second display buffer memories, acquires second display data forming a display screen with current coordinates of the display center point as a center, stores the second display data into said second of said first and second display buffer memories, and switches a displaying operation for the first display data to a displaying operation for the second display data when writing the second display data into the second of said display buffer memories is completed.

* * * * *